(12) United States Patent
Haug et al.

(10) Patent No.: US 11,402,219 B2
(45) Date of Patent: Aug. 2, 2022

(54) METHOD AND LOCALIZATION SYSTEM FOR SETTING UP OR UPDATING AN ENVIRONMENT MAP

(71) Applicant: Robert Bosch GmbH, Stuttgart (DE)

(72) Inventors: Florian Haug, Ditzingen (DE); Markus Ferch, Beilstein (DE); Sheung Ying Yuen-Wille, Leonberg (DE); Stefan Leibold, Talheim (DE); Torsten Scherer, Tuebingen (DE); Yorck Von Collani, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 16/294,118

(22) Filed: Mar. 6, 2019

(65) Prior Publication Data

US 2019/0277641 A1    Sep. 12, 2019

(30) Foreign Application Priority Data

Mar. 7, 2018  (DE) .......................... 102018203440.0

(51) Int. Cl.
*G01C 21/00* (2006.01)
*G01C 21/32* (2006.01)
*G06F 16/23* (2019.01)
*G06F 16/29* (2019.01)

(52) U.S. Cl.
CPC ......... *G01C 21/32* (2013.01); *G06F 16/2379* (2019.01); *G06F 16/29* (2019.01)

(58) Field of Classification Search
CPC ...... G01C 21/32; G01C 21/206; G01C 21/20; G06F 16/2379; G06F 16/29; G05D 1/0274; G05D 1/0285; G05D 1/0236; G05D 1/024; G05D 1/0242; G05D 1/0257; G05D 1/0259; G05D 1/0214; G05D 1/0221; G05D 1/0276; G05D 2201/02

See application file for complete search history.

(56) References Cited

U.S. PATENT DOCUMENTS

| | | | | |
|---|---|---|---|---|
| 9,791,539 | B2 * | 10/2017 | Teicher | G07C 9/28 |
| 10,739,459 | B2 * | 8/2020 | Castorena Martinez | ................... G01S 7/497 |
| 2010/0109864 | A1 * | 5/2010 | Haartsen | G01S 5/0236 340/539.13 |
| 2015/0038171 | A1 * | 2/2015 | Uilecan | H04W 4/027 455/456.3 |

(Continued)

*Primary Examiner* — Harry Y Oh
(74) *Attorney, Agent, or Firm* — Norton Rose Fulbright US LLP; Gerard Messina

(57) ABSTRACT

A method is described for setting up or updating an environment map and for ascertaining a position within the environment map based on a scan of an environment using electromagnetic radiation, in which environment data is ascertained by scanning the environment with the aid of at least one localization system using electromagnetic radiation, data pertaining to at least one wireless communications unit are collected by the at least one localization system, the ascertained environment data are allocated to at least one position or to at least one section of the environment map, and the collected data of the at least one wireless communications unit are used by an internal control unit or an external control unit of the localization system for plausibilizing the at least one position or the at least one section of the environment map of the ascertained environment data. In addition, a localization system is described.

6 Claims, 2 Drawing Sheets

(56) References Cited

U.S. PATENT DOCUMENTS

| | | | | |
|---|---|---|---|---|
| 2016/0330584 A1* | 11/2016 | Akpinar | ............... | H04W 4/025 |
| 2017/0091819 A1* | 3/2017 | Krause | ............... | G06Q 30/0259 |
| 2017/0124781 A1* | 5/2017 | Douillard | ......... | G08G 1/096816 |
| 2018/0321353 A1* | 11/2018 | Patel | .................... | H04B 17/318 |
| 2019/0065863 A1* | 2/2019 | Luo | ..................... | G06K 9/6267 |
| 2019/0086212 A1* | 3/2019 | Koshy | .................. | H04W 4/024 |
| 2019/0213438 A1* | 7/2019 | Jones | ....................... | G06T 7/74 |

\* cited by examiner

METHOD AND LOCALIZATION SYSTEM FOR SETTING UP OR UPDATING AN ENVIRONMENT MAP

FIELD OF THE INVENTION

The present invention relates to a method for setting up or updating an environment map and for ascertaining a position within the environment map based on a scan of an environment using electromagnetic radiation, and it relates to a localization system.

BACKGROUND INFORMATION

Localization methods are relevant for mobile vehicles because they allow the vehicle to be located. In addition, they make it possible to implement more advanced functions such as central monitoring or an automated navigation. In indoor areas, for example, localization methods that manage without a satellite-based signal are known. Such areas may be intralogistics or production environments, for instance. Infrastructure-free methods are typically employed for a localization with the aid of what is known as laser-localization systems (LLS) using a 2D or 3D laser. An LLS requires a laser map of the environment and attempts to ascertain the most likely location through a continual reconciliation of the monitored laser data with the environment map.

Environment maps are usually generated in the course of a mapping drive during an initial operation of an environment with the aid of what is known as SLAM algorithms (simultaneous localization and mapping). During the mapping drive, the position is ascertained on a continuous basis and the monitored laser data are transferred to a map. Using optimization methods, position errors during the mapping drive are eliminated and a metrically precise map is generated. Advanced LLSs have the ability to update their maps during the regular localization operation and are therefore able to be operated even in variable environments.

In addition, radio-based transmission technologies are in existence that are based on WLAN or Bluetooth signals, for instance, which may be used not only for the transmission of messages but also for a localization. However, due to physical marginal positions and interference, they are very imprecise and in conventional technologies like WLAN, for instance, are limited to a few meters in practice. Moreover, they are not infrastructure-free because they require the respective transmission devices of the technology employed. Every technology allows different transmission devices to be distinguished on the basis of their individual signatures. In WLAN transmission devices, for example, this could be the SSID (service set identifier) of the respective WLAN network, or the unique BSSID (basic service set identifier) of the access point (MAC address), and in the case of Bluetooth transmission devices, it may be the device name.

The local ambiguities within the laser map due to the limited field of vision of the laser constitute a potential weakness of an LLS. Pertinent examples are similar corridors in different parts or floors of a building or similar areas in different buildings or production halls where the mobile vehicle or the LLS is operating. This may lead to problems, in particular during the initial ascertainment of the position after the new start or in a malfunction, since the LLS is unable to distinguish between different possible areas without further information or further actions.

A similar situation is posed by the differentiation as to whether or not the LLS is actually located within the mapped region. Ambiguities may be problematic in such a context as well, because it is impossible to distinguish between a similar but unmapped region and a corresponding mapped region.

Moreover, temporary changes in the environment may lead to a less meaningful reconciliation process between an outdated map and current data and thus increase the ambiguities when setting up or updating the map.

SUMMARY

An object on which the present invention is based may be seen as providing a method and a localization system which are able to reduce ambiguities when determining a position, and when setting up and/or updating an environment map.

According to one aspect of the present invention, a method is provided for setting up or updating an environment map and for ascertaining a position within the environment map based on a scan of an environment using electromagnetic radiation.

Environment data are ascertained by scanning the environment with the aid of at least one localization system using electromagnetic radiation.

In addition, the at least one localization system collects data in connection with at least one wireless communications unit.

The ascertained environment data are allocated to at least one position or at least one section of the environment map.

An internal control unit or an external control unit of the localization system uses the collected data of the at least one wireless communications unit to plausibilize the at least one position or the at least one section of the environment map of the ascertained environment data.

The generated electromagnetic radiation may preferably be light beams, laser beams or radar waves. For example, they are able to be generated by a radar device, a LIDAR device or the like and be emitted inside a scanning region. The radiation reflected at an environment may subsequently be received and evaluated. The evaluation is able to be carried out by an internal control unit of the localization system or by an externally disposed control unit. For example, the localization system may be a laser localization system. The localization system may preferably be able to receive direction-dependent wirelessly transmittable signals and evaluate them. More specifically, the wirelessly transmitted data, e.g., the SSID, are able to be received. In addition, the at least one localization system may measure a signal strength or a direction-dependent signal of the at least one communications device, for example. The localization system may be equipped with receiving antennas or antenna arrays for this purpose, which are able to be coupled with the control unit in a data-transmitting manner.

The wireless communications units, for example, may be WLAN hotspots or access points, Bluetooth transmitters, mobile radio antennas and the like.

With the aid of the present method, the local radiofrequency spectrum or a totality of all radio signatures of an environment is able to be entered into the environment map during a mapping drive together with the environment data. This makes it possible to realize an additional information channel which may be coupled with the localization system and thus be used to reduce or exclude ambiguities. The ambiguities are able to be reduced in particular when determining a position, and when setting up and/or updating an environment map. The position ascertained through the position determination may include both a location and an orientation at a location or a point and in the further course. The local radio signatures of the wireless communications units may be utilized for locally limiting an allocation of the ascertained environment data of the localization system.

The question as to whether or not the localization system is in an already mapped region is easier to answer via the radiofrequency spectrum because the radio signatures often have an easily comparable ID, which may even be a unique UID (e.g., a MAC address of the WLAN access point). Thus, it must simply be compared whether a sufficient quantity of radio signatures from the current radiofrequency spectrum has been entered into the environment map. In case of an UID, even a single known signature may be sufficient. Ambiguities of the localization system may usually be quickly and clearly resolved via the radiofrequency spectrum. For all location hypotheses during the mapping, the recorded radiofrequency spectrums are able to be compared to the current radiofrequency spectrum and the particular location be selected that has the closest matching radiofrequency spectrum. This makes it possible to improve the availability of the localization system following the initial mapping drive and to reduce the error rate.

The demands on the quality and coverage of the radio-based infrastructure are low in the method according to the present invention. It is therefore usually sufficient to use the already existing wireless infrastructure. The at least one localization system may thus remain roughly infrastructure-free. In addition, the at least one localization system is able to continue its operation in the event of a failure of the radio-based system. In the same way, a map update is still possible in the event of changes in the spectrum.

The locations of the radio transmitters or the communications units may be unknown so that adjacent external communications units may also be utilized as an additional source of information.

With the aid of the method according to the present invention, a robust decision is able to be made between mapped and unmapped regions during the mapping by the at least one localization system, thereby allowing for a robust and less error-prone map update and map generation.

According to one specific embodiment of the present method, at least one mobile or at least one stationary localization system scans the environment using electromagnetic radiation. The at least one localization system may thus be a mobile vehicle having a sensor system and an internal control unit. Alternatively or additionally, the at least one localization system may be developed as a stationary system or be in a data-transmitting communications connection with a stationary, external control unit. The environment data collected in a mobile manner and data of the at least one communications unit are able to be loaded into the external control unit and processed there and made available utilizing greater power reserves.

According to one further exemplary embodiment of the present method, an already established environment map is at least regionally updated using the filtered environment data in the internal or external control unit. On the basis of the ascertained environment data, an update of a changing environment is able to be carried out. The ascertained location hypotheses that were verified by the information of wireless communications units may be utilized for updating of the environment map. This makes it possible to allocate the environment data in a locally unambiguous manner.

According to one further exemplary embodiment of the present method, the external or internal control unit sets up at least one environment map section with the aid of the filtered environment data. The validated environment data may have unique local allocations, so that it is technically easy to verify whether the ascertained environment data are to be integrated into an already known and mapped environment or whether the data represent a new, unmapped environment. This may be the case for still unknown wireless communications units, for instance.

According to another exemplary embodiment of the present method, the internal or external control unit determines a position of the at least one localization system within the environment map based on the ascertained environment data of the environment. The environment data are preferably ascertained by scanning the environment using electromagnetic radiation. Through a comparison of the ascertained environment section, a position estimate or a unique localization is able to be carried out with the aid of an interpolation or superimposition to environment maps that were already set up.

According to one further exemplary embodiment of the present method, the position of the at least one localization system is determined by comparing the filtered environment data to a generated or updated environment map. An allocation of the respective position of the ascertained environment data is preferably accomplished by comparing the ascertained environment data with contours and features of an environment map. Regions featuring the best agreement are thus able to be ascertained, and ambiguities are filtered or excluded by utilizing the positions and properties of stationary wireless communications units.

According to one further exemplary embodiment of the present method, the localization system uses a SLAM algorithm, which is based on data of the at least one wireless communications unit, for setting up or updating the environment map and for ascertaining a position of the at least one localization system within the environment map. With the aid of the ascertained data and information pertaining to the at least one wireless communications unit, ambiguities in the execution of the SLAM method are able to be robustly and quickly avoided or may at least be reduced.

According to one further exemplary embodiment of the present method, the data of the at least one wireless communications unit are used for filtering location hypotheses of the SLAM algorithm. During a mapping drive of the localization system, all available information at each location must be recorded in addition to the environment data. As a minimum, this may be the signature, optionally also the receiving strength, the runtime, and a receiving angle. The decision as to which grid is used to store the ascertained environment data depends on the technology that forms the basis. Preferably, the information changes only slightly between the individual grid points. In a WLAN network, this is the case at a distance of the points of approximately 2 m, for instance. Locations between grid points may be allocated to the closest grid point with regard to the mapped signature, or its signature may be reconstructed from the adjacent points using interpolation.

In contrast to radio-based location algorithms, the method according to the present invention does not require a certain minimum measure of information but may simply record all available data and information at each location.

Since precise location hypotheses may already be specified via the localization system, each additional item of information has the result that the remaining ambiguities are at least able to be reduced and, in the best case, resolved. Thus, no minimum number of WLAN hotspots, for example, must be available.

In addition, more advanced systems may be implemented, which are able to reconstruct the position and the range of the transmitters and thus have the ability to use a parallel radio SLAM method. A grid is therefore no longer required, and the necessary information may thus be ascertained in situ from the positions and a given location.

The method according to the present invention is even able to operate with partial information or poor signals. Such disadvantageous marginal conditions may lead to a failure of a purely radio-based localization method, for instance. Since exact location hypotheses are already available via the localization system, information without high demands in terms of its quality or completeness is already sufficient to resolve ambiguities.

According to one further exemplary embodiment of the present method, the internal or external control unit uses the data of the at least one wireless communications unit for setting up or updating a location-dependent signature map of the at least one wireless communications unit. Furthermore, it is possible to update a map when changes occur in the spectrum. In this way, a further map, which is recorded in parallel with the environment map and which features information and spectrums of the wireless communications units within the environment map, is able to be set up or updated.

The localization system may often make passive use of the radio-based transmission technology since it records or scans only the signatures of the wireless communications units. It is therefore also possible to use safety-relevant and protected wireless networks for carrying out the present method.

According to one further exemplary embodiment of the present method, the data of the at least one wireless communications unit includes identifying information, the signal strength with respect to at least one communications unit, the receiving angle between the at least one localization system and the at least one wireless communications unit, the runtime of a signal between the at least one localization system and the at least one wireless communications unit and/or overlap combinations between a plurality of wireless communications units. A received radiofrequency spectrum at a location may be made up of a plurality of radio signatures of stationary transmitters having an adequate range. Different standards and technologies may be measurable that are used in superimposed form. In an advantageous manner, a local reference to the environment map is able to be established based on the measurable information. For example, depending on the frequency and standard, WLAN networks having a range of <100 m may be suitable for providing location-dependent supplementary information. An ambiguous SSID or a unique BSSID such as a MAC address of an access point is able to be used in this context. Moreover, Bluetooth transmission units having a range of <100 m are detectable by the at least one localization system and may be used to resolve ambiguities. The present method may consider the device name or a device address of the transmitter as additional local information. Alternatively or additionally, wireless communications units using the Zigbee standard are able to be ascertained and used by the localization system. Ranges of the wireless connection of 10 to 100 m are able to be realized, and MAC addresses of the transmitters may constitute unique location-based information.

Alternatively or additionally, it is not only possible to use the signature; instead, further properties of the radio-based transmission technology may be utilized to allow for an estimate of additional geometrical parameters. One further possible variant, for instance, may be an item of distance information, which is realizable by measurable runtimes of a signal, such as in a handshake method. If a plurality of slightly differently positioned receivers or antenna units of the localization system is involved, differences in the respective runtimes may be used to ascertain a transmission and/or receiving angle of the wireless communications unit. This allows for an unequivocal localization of the at least one wireless communications unit. The different variants and different information may also be used in various other combinations. This makes it possible to carry out an approximate localization. This approximate or rough localization is able to be utilized for plausibilizing the ascertained environment data.

According to a further aspect of the present invention, a localization system for carrying out the method according to the present invention is provided. The localization system has at least one radiation source for the generation of electromagnetic radiation for scanning its environment. In addition, the localization system has at least one receiving unit for receiving the radiation reflected by the environment, as well as at least one antenna unit for collecting information of at least one external wireless communications unit. An internal control unit is used to control the at least one transmission unit and for storing and evaluating data of the at least one receiving unit and the at least one antenna unit.

The localization system may preferably have at least one sensor for measuring distance data, a processing unit or control unit as well as a memory, which holds the map of the environment. The localization system is able to be mounted on a mobile platform, e.g., a floor conveyor, tractor, forklift reach truck, an electronic butler, robotic maintenance machinery or a similar device. In addition, the localization system has a receiving unit or antenna unit for measuring a radiofrequency spectrum. As a result, it is possible to measure the wirelessly emitted information of static radio transmitters in an environment.

According to one exemplary embodiment, the localization system has an external server unit including an external control unit, and the collected data are transmittable via a communications link from the internal control unit to the external control unit. For example, the external control unit may be a Cloud or a central server, which is able to provide the current maps and to collect and evaluate the ascertained environment data of different mobile or static localization systems.

In the following text, preferred exemplary embodiments of the present invention are described in greater detail with the aid of greatly simplified schematic representations.

DETAILED DESCRIPTION

Figure 1:
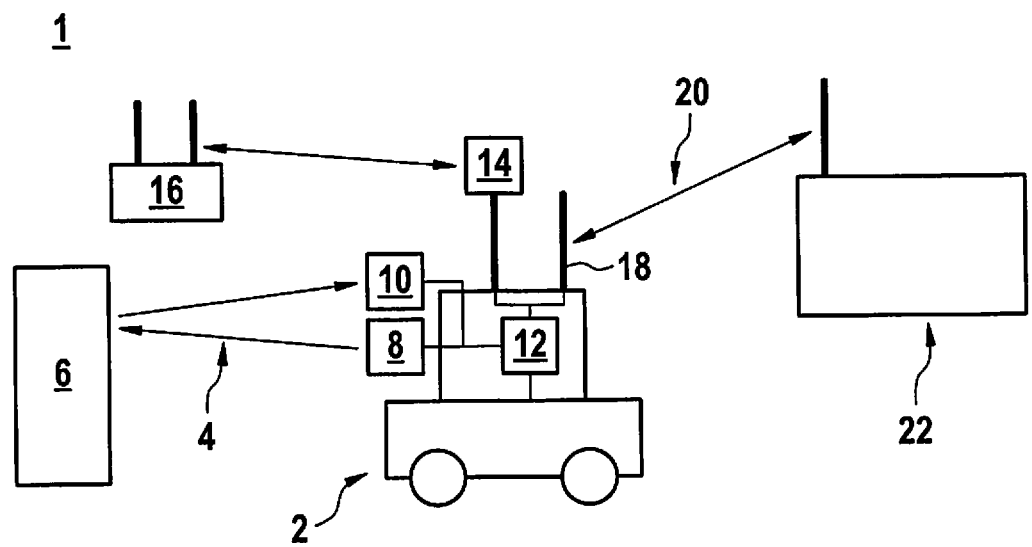
FIG. 1 a schematic representation of a localization system according to one specific embodiment of the present invention.

The same constructive elements in the figures have been provided with the same reference numerals in each case.

FIG. 1 shows a schematic illustration of a localization system 1 according to one specific embodiment of the present invention. Localization system 1 is developed as a mobile unit 2 in this instance, which is able to scan an environment using electromagnetic radiation 4 and thus detect objects or environment contours 6, for instance.

Mobile unit 2 has a transmission device 8 for the output of electromagnetic radiation 4. Transmission unit 8 is developed as an infrared laser. A receiving unit 10 is able to receive the radiation reflected at environment contours 6 and to convert it into environment data which are able to be stored and evaluated by an internal control unit 12.

Mobile unit 2 has an antenna unit 14, which has the ability to identify local wireless communications units 16 and measure their signal strength according to the exemplary embodiment. Alternatively, some other item of network information such as an SSID may be used to identify local wireless communications units 16. In addition, network information such as an SSID of wireless communications unit 16 is able to be ascertained with the aid of antenna unit 14 and used by internal control unit 12 in order to carry out a SLAM method, for example.

Internal control unit 12 is connected to a communications device 18 by way of which a data-conducting communications link 20 to an external control unit 22 may be established. External control unit 22 is able to receive and evaluate environment data of a plurality of mobile units 2. External control unit 22 may be a Cloud or a server, for instance.

Figure 2:
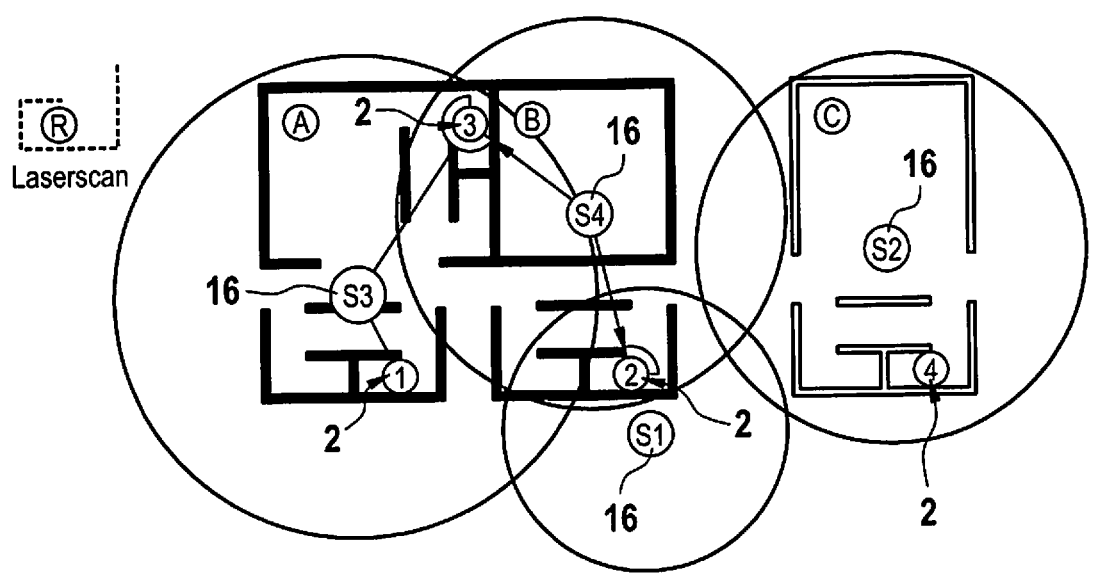
FIG. 2 an environment featuring a localization system according to one specific embodiment of the present invention.

FIG. 2 shows an environment U having a localization system 1 and/or a mobile unit 2 according to one specific embodiment of the present invention. It is a fictional production facility U which encompasses three hall-floor plans A-C. Halls A and B are already mapped. Hall C has not been mapped until now and hence is unknown.

In addition, four wireless communications units 16, which are developed as radio transmission devices S1-S4, are located in environment U with differentiable signatures. The range is schematically illustrated in the form of a circle around respective transmission devices S1-S4. In addition, different positions P1-P4 of mobile unit 2 are illustrated where scanning of the immediate environment is carried out in a horizontal scanning area of 360 degrees.

Shown on the left side in the figure is an exemplary laser scan performed in a pointwise manner at a position P1. A comparison with the environment map in internal control unit 12 may suggest that possible locations or positions P1, P2, and P3 could be involved. A possible position P4, which would feature a corresponding laser scan, is also located in unmapped region C.

Mobile unit 2 may ascertain different radiofrequency spectrums in this context and thereby resolve this ambiguity. If mobile unit 2 receives the signature of communications unit S1, then it must be located at position P2 or the ascertained laser scan must be allocated to position P2 as environment data.

If the signature of communications unit S2 is measured, then this constitutes an unknown signature, which means that mobile unit 2 is located in an unmapped region C.

A measurable signature of communications unit S3 may thus be allocated to a possible position P1 or P3 of mobile unit 2 or to the ascertained environment data. A distance to communications unit S3 is able to be estimated in order to allow the ambiguity between position P1 and P3 to be resolved. This may particularly be realized by measuring a signal strength using antenna unit 14. At position P1, a higher signal strength is expected than at position P3.

When the signature of communications unit S4 is received, the ascertained laser scan is able to be allocated to position P3 or P2. An angle dependency between the position and communications unit S4 may be exploited to resolve the ambiguity. Alternatively or additionally, the combinations of measurable signatures of further communications units Si and S3 may be utilized. Thus, the presence of signatures of different communications units 16 may be used to plausibilize locations P1-P4. This allows the present method to be carried out even in the absence of communications units since individual transmission devices may not be able to be received at any given time due to disturbances by buildings (such as interferences) or a failure. The positions of respective communications units S 1-S4 may be unknown. What may be known are merely the signatures at the respective locations, or at the closest grid point, which were monitored during the mapping drive.

Figure 3:
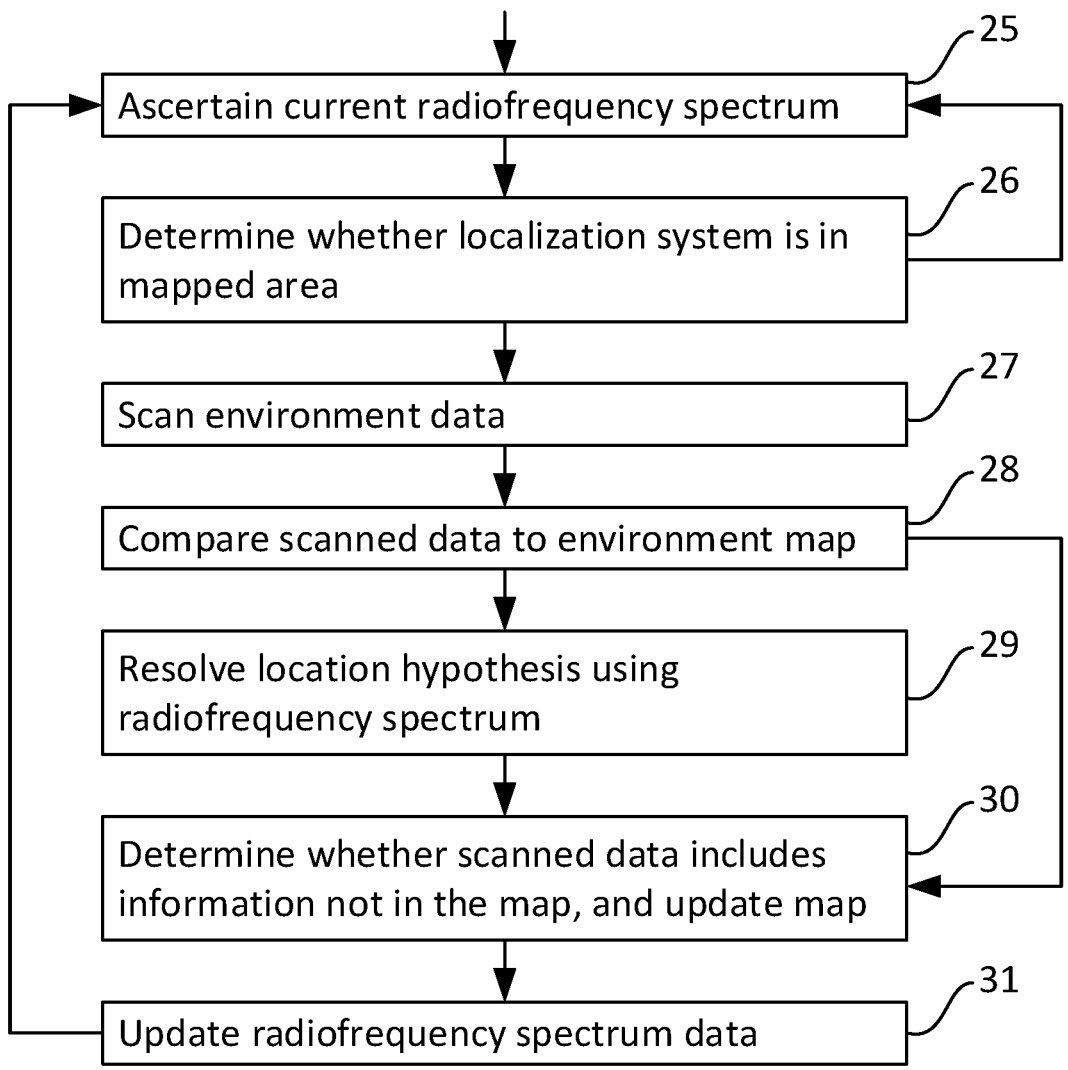
FIG. 3 a schematic flow diagram of a method according to one specific embodiment of the present invention.

FIG. 3 shows a schematic flow diagram of a method 24 according to one specific embodiment of the present invention. In a first step 25, localization system 1 starts up after an initialization. Using antenna unit 14, the current radiofrequency spectrum at the current location P1-P4 is ascertained.

In a further step 26, it is checked with the aid of the radiofrequency spectrum whether localization system 1 is in a known or mapped area or whether no known signatures are to be found within the radiofrequency spectrum and an unknown, i.e. unmapped, region is involved. In the most straightforward case, it is sufficient for the decision to find a single, unequivocally identifiable signature in the radiofrequency spectrum that is also recorded in the map. However, if the latter is not the case, then localization system 1 is not available and a return to first step 25 takes place again. If localization system 1 already knows its location from previous measurements, then steps 25, 26 may be omitted.

In a further step 27, environment data are ascertained by scanning the environment.

Then, a comparison 28 of the laser scan or the environment data with the environment map is carried out. A consideration and fusion of past measurements and, ultimately, a return of the location hypotheses may optionally also take place.

Steps 25 and 26 may also be carried out in parallel with steps 27 and 28.

In a further step 29, ambiguities within the location hypotheses, provided such ambiguities exist, may be resolved with the aid of the ascertained radiofrequency spectrums. This step 29 is able to be omitted if a single unequivocal hypothesis of the location was ascertained.

At the latest following this step 29, localization system 1 may forward its status to a higher-level system or to an external control unit 22. The status may be the location, a list of multiple locations including their quality (if an ambiguity could not be resolved) or an error description.

If the location was able to be ascertained unequivocally and with a sufficient quality in the preceding steps 25 to 29, then it may be checked in a further step 30 whether the environment data of the laser scan include further information that goes beyond the information of the environment map. If this is the case, these changes may be utilized to update the environment map. The environment map may be stored in internal control unit 12 or in a central or external Cloud 22 or a server 22.

In a further step 31, similar to step 30, the measured data of the radiofrequency spectrum are able to be updated. Step 31 is preferably carried out in combination with first step 25.

What is claimed is:

1. A method for updating an environment map, the method comprising:
using electromagnetic radiation to scan an environment at a location that is in one of a plurality of areas represented in an environment map;

based on the scan, detecting presence of a plurality of environmental contour types;

identifying all of the plurality of areas in which a first one of the plurality of environmental contour types is located, the identified areas being a subset of the plurality of areas;

detecting one or more of a plurality of signatures at the location;

identifying one of the subset of the plurality of areas in which all of the detected one or more of the plurality of signatures are detectable based on the environment map, wherein:

the environment map identifies for each respective one of the plurality of signatures a respective coverage area in which the respective one of the plurality of signatures is present, each of the plurality of signatures being a respective signal emitted by a respective one of a plurality of stationary wireless communications units; and there is partial overlap between some of the coverage areas; and updating the representation of the identified one of the subset of the plurality of areas in the environment map to include a representation of a second one of the detected plurality of environmental contour types.

2. The method as recited in claim 1, wherein the scan is performed by a mobile unit.

3. The method as recited in claim 1, wherein the method includes constructing and/or updating the environment map using a SLAM algorithm.

4. The method as recited in claim 1, wherein the identifying of the one of the subset of the plurality of areas is further based on at least one of: (a) respective signal strengths of the detected one or more of the plurality of signatures and (b) respective receiving angles of the detected one or more of the plurality of signatures relative to a localization system that detected the one or more of the plurality of signatures.

5. A localization system for updating an environment map, the system comprising:
   at least one radiation source;
   at least one receiving unit;
   at least one antenna unit; and
   an internal control unit;

wherein:
   the localization system is configured to scan an environment at a location that is in one of a plurality of areas represented in an environment map, the scanning being performed by the at least one radiation source generating electromagnetic radiation and the at least one receiving unit receiving a reflection of the generated electromagnetic radiation from the environment;
   the internal control unit is configured to:
      based on the scan, detect presence of a plurality of environmental contour types; and
      identify all of the plurality of areas in which a first one of the plurality of environmental contour types is located, the identified areas being a subset of the plurality of areas;
   the localization system is configured to use the at least one antenna unit to detect one or more of a plurality of signatures at the location;
   the internal control unit is configured to identify one of the subset of the plurality of areas in which all of the detected one or more of the plurality of signatures are detectable based on the environment map;
   the environment map identifies for each respective one of the plurality of signatures a respective coverage area in which the respective one of the plurality of signatures is present, each of the plurality of signatures being a respective signal emitted by a respective one of a plurality of stationary wireless communications units;
   there is partial overlap between some of the coverage areas; and
   the internal control unit is configured to update the representation of the identified one of the subset of the plurality of areas in the environment map to include a representation of a second one of the detected plurality of environmental contour types.

6. The localization system as recited in claim 5, further comprising:
   an external server unit having an external control unit, wherein the internal control unit is configured to transmit the updated map via a communications link to the external control unit.

* * * * *